UNITED STATES PATENT OFFICE.

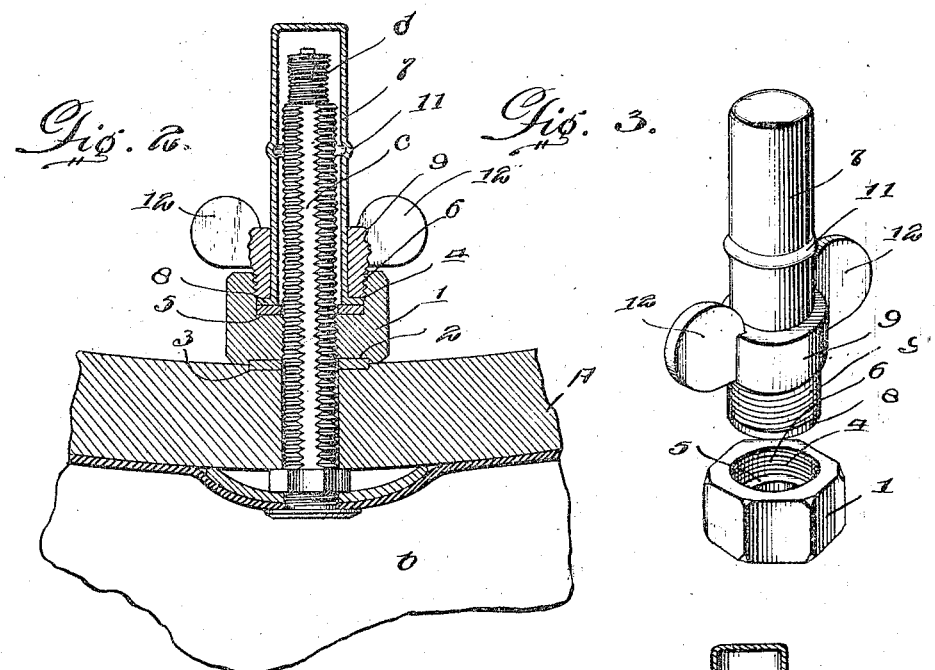
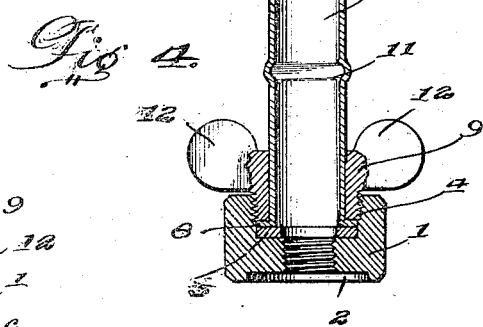
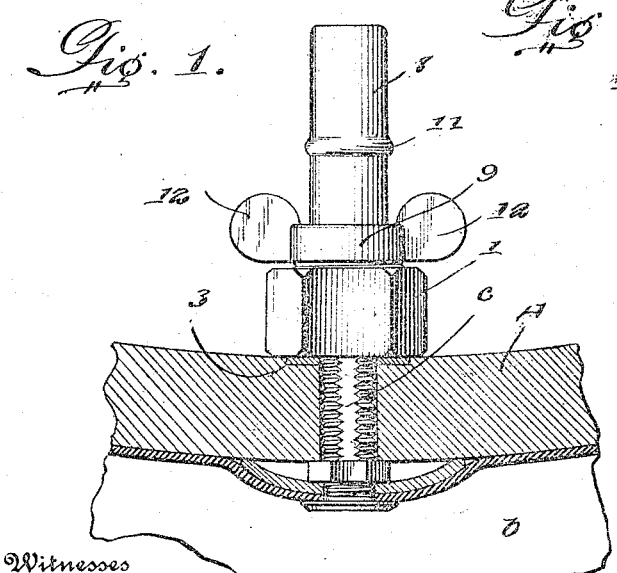

CECIL E. LLOYD, OF PENSACOLA, FLORIDA.

VALVE-CAP.

1,155,253.

Specification of Letters Patent.  Patented Sept. 28, 1915.

Application filed January 15, 1915. Serial No. 2,464.

*To all whom it may concern:*

Be it known that I, CECIL E. LLOYD, a citizen of the United States of America, residing at Pensacola, in the county of Escambia and State of Florida, have invented new and useful Improvements in Valve-Caps, of which the following is a specification.

This invention relates to improvements in caps for the valves of inflatable tires.

In carrying out the present invention, it is my purpose to provide a cap for valves of the class described which may be readily and quickly applied to the valve and removed therefrom without the necessity of rotating the cap to thread the latter onto the valve and remove the same therefrom.

It is also my purpose to provide a valve cap which when applied to the valve may be rigidly and securely fastened thereto so as to prevent accidental displacement of the cap, and wherein the component parts of the cap will be so correlated and arranged as to eliminate the possibility of derangement.

Furthermore, I aim to provide a cap of the type set forth which will embrace the desired features of simplicity, efficiency and durability, which may be manufactured and marketed at a minimum expense and which may be readily applied to any type of tire valve now in use without changing the construction of such valve.

With the above and other objects in view, the invention consists in the construction, combination and arrangement of parts hereinafter set forth in and falling within the scope of the claims.

In the accompanying drawing; Figure 1 is a view in side elevation of a tire valve equipped with a cap constructed in accordance with the present invention, a portion of the felly of the wheel being shown in longitudinal section. Fig. 2 is a longitudinal sectional view through the cap applied to the valve, the latter being shown in side elevation. Fig. 3 is a perspective view of the cap and securing device removed from the valve. Fig. 4 is a longitudinal sectional view through the cap securing devices and jam nut removed from the valve.

Referring now to the drawing in detail, A designates a portion of the felly of a wheel carrying an inflatable tire $b$ equipped with the usual inflating valve $c$ projecting through an opening in the felly and extending toward the center of the wheel, as usual. The outer surface of the body of the valve $c$ is threaded throughout its entire length and the outer end of the body is circumferentially reduced to form a nipple $d$ exteriorly threaded to receive the usual valve cap.

Threaded onto the body of the valve is a jam nut 1 designed to abut against the inner surface of the wheel felly to hold the tire valve securely in position. Formed in the outer end of the jam nut 1, that is, the end of the nut engaging the felly, concentrically of the bore in the nut is a seat 2 and disposed within the seat 2 is a washer 3 forming an air tight joint between the outer end of the jam nut and the felly. In the present instance, the end wall of the seat 2 is convexed in cross section so that the washer will be compressed against the felly. Formed in the opposite end of the jam nut 1 is a relatively deep seat 4 and seated upon the end wall of the seat 4 is a washer 5 composed of rubber, felt or other suitable material. The side wall of the seat 5 is screw threaded as at 6.

7 designates a cap constructed of metal or other suitable material and in the form of a tubular sleeve having one end closed and the other end open, as is usual in the construction of the valve caps of inflatable tires of motor vehicles. Formed on the open end of this cap 7 is an outwardly projecting circumferential flange 8 that seats against the washer 5 in the seat 4 when the cap 7 is slipped over the outer end of the body of the valve. Surrounding the cap 7 adjacent to the flanged end thereof and of a diameter slightly greater than that of the flange is a collar 9 having the flanged end thereof screw threaded as at 9' to engage the threads 6 on the side wall of the seat 4 and formed on the opposite end of the collar at diametrically opposite points are thumb pieces 12 whereby the collar may be revolved upon the casing to engage the threads 9' with the threads 6 and disengage such threads. In the present instance, an annular bead 11 is formed on the cap 7 and spaced apart from the flange 8 and coöperates with the flange 8 to prevent accidental removal of the securing collar 9 from the cap when the cap is removed from the body of the valve.

In practice, the cap 7 is slipped over the body of the valve and the flange 8 seats against the washer 5 in the seat 4. The collar 9 is now revolved under the action of the wings or thumb pieces 10 and the threaded end portion of such collar engages the wall of the seat 4 to clamp the flange 7 against the washer 5 and the latter against the end wall of the seat 4, thereby effecting a secure and rigid connection between the cap and the body. To remove the cap it is only necessary to give the collar 9 a few turns in the opposite direction and when the collar moves out of the seat 4 the cap and collar may be lifted from the valve box.

It will be seen that I have provided a valve cap which may be readily and quickly applied to the body of the valve and removed therefrom without the necessity of turning the cap through a distance equal to the lengths of the threads on the body.

While I have herein shown and described the preferred form of my invention by way of illustration, I wish it to be understood that I do not limit or confine myself to the precise details of construction herein described and delineated, as modification and variation may be made within the scope of the claims without departing from the spirit of the invention.

I claim:

1. The combination with a tire valve, of a jam nut threaded onto the body of said valve and having one end thereof formed with a seat, a washer engaging the end wall of said seat, a cap surrounding the body of said valve and adapted to slide onto and off of the same, a flange formed on one end of said cap and disposed within said seat in engagement with the washer therein, and means for effecting a connection between the flanged end of said cap and seat.

2. The combination with a tire valve, of a jam nut threaded onto the body of said valve and having one end thereof formed with a seat, a cap surrounding the body of said valve and adapted to slide onto and off of the same and having the inner end thereof formed with a flange disposed within said seat, and a collar surrounding said cap and threaded into said seat and engaging the flanged end of said cap to hold the latter to said nut.

3. The combination with a tire valve, of a jam nut threaded onto the body of said valve and having one end thereof formed with a seat, a cap surrounding the body of said valve and adapted to slide onto and off of the same and having the inner end thereof formed with a flange disposed within said seat, and a collar surrounding said cap and threaded into said seat and engaging the flanged end of said cap to hold the latter to said nut, said cap being formed with an annular bead acting to prevent accidental removal of said collar.

In testimony whereof I affix my signature in presence of two witnesses.

CECIL E. LLOYD.

Witnesses:
W. S. LURTON,
M. GONZALEZ.